United States Patent [19]

Lucas

[11] Patent Number: 5,655,060
[45] Date of Patent: Aug. 5, 1997

[54] TIME OPTIMAL TRAJECTORY FOR CLUSTER TOOL ROBOTS

[75] Inventor: Brian Mark Lucas, Marblehead, Mass.

[73] Assignee: Brooks Automation, Lowell, Mass.

[21] Appl. No.: 414,340

[22] Filed: Mar. 31, 1995

[51] Int. Cl.$^6$ .................................................. G05B 13/00
[52] U.S. Cl. ..................... 395/85; 395/90; 395/95; 395/96; 395/97; 318/560; 318/568.21; 901/19
[58] Field of Search .................. 395/85, 90, 95, 395/96, 97; 318/560, 568.21; 901/19

[56] References Cited

U.S. PATENT DOCUMENTS

| | | | |
|---|---|---|---|
| 4,180,276 | 12/1979 | Hendrickson | 414/752 |
| 4,666,366 | 5/1987 | Davis | 414/749 |
| 4,730,976 | 3/1988 | Davis et al. | 414/749 |
| 4,909,701 | 3/1990 | Hardegen et al. | 414/749 |
| 5,003,522 | 3/1991 | Dolby | 369/44.32 |
| 5,076,399 | 12/1991 | Horbruegger et al. | 187/116 |
| 5,272,423 | 12/1993 | Kim | 318/560 |

OTHER PUBLICATIONS

"Minimum–Time Trajectory Planning For Industrial Robots With General Torque Constraints" Shin et al., 6 pages.
"A Concept for Manipulator Trajectory Planning"; Pfeiffer et al., 7 pages.
"Improving the Efficiency of Time–Optimal Path–Following Algorithm". Slotine et al., 1989, IEEE, 7 pages.
"Robust Computation of Path Constrained Timed Optimal Motions", Shiller et al., 1990, IEEE, 6 pages.
Rieswijk et al, "A Robust and Efficient Approach for the Time Optimization of Path Constrained Motions of Robotic Manipulators Incorporating Torque and Jerk Constraints", IEEE International Intelligent Control Symposium, 1992.

*Primary Examiner*—George B. Davis
*Attorney, Agent, or Firm*—Perman & Green

[57] ABSTRACT

A method and apparatus involving the application of an algorithm used for finding the time optimal trajectory for torque limited Industrial Robots, to achieve the operation of Cluster Tool Robots in an improved manner by modifying the applied algorithm through adding two additional constraints, i.e., jerk (the rate of change of acceleration) and the acceleration seen by the load. This modification renders it possible to create a robot arm trajectory that minimizes travel time by minimizing the excitation of uncontrolled resonances and avoiding command of an acceleration that would exceed the force of friction between a substrate holder on the end of the arm and a substrate held thereon by friction.

13 Claims, 5 Drawing Sheets

TIME OPTIMAL TRAJECTORY FOR CLUSTER TOOL ROBOTS

BACKGROUND OF THE INVENTION

1. Field of the Invention

The present invention relates to articulated arm transfer devices, such as Cluster Tool Robots, and more particularly to a method and means for shortening the transfer time during robot operation with frictionally held substrates.

2. Problem to be Solved

Material handling robots, e.g., Cluster Tool Robots, are commonly used in the atmosphere or vacuum chambers for handling workpieces such as semiconductor wafers, flat-panel displays, and other like substrates, during processing. These tools consist of a rotatably and transferably mounted plurality of extendible and retractable arms, each having an end effector for supporting a workpiece during arm manipulation. Some examples of such devices are disclosed in U.S. Pat. Nos. 4,666,366, 4,730,976, 4,909,701, and 5,180,276.

Unlike conventional Industrial Robots which provide means for securing payloads when held and manipulated, substrate handling robots, such as Cluster Tool Robots, typically rely on the friction between the load, i.e., the substrate, and the end effector to hold the substrate thereon. This is due to the fact that securing of the payload with mechanical clamping on the top side or edges usually results in objectionable particulate generation and contamination or in substrate damage. The use of a vacuum holddown for securing the payload in atmospheric robots avoids these problems but other control problems can arise if acceleration is changed instantaneously as will be discussed below. The problem in frictional hold applications is that the substrate will slide if the acceleration force at the load exceeds the frictional force holding it, so that the operating or transfer time of the robot arms in their working trajectory is limited by the magnitude of this frictional force. Accordingly, when attempting to increase substrate handling throughput by shortening the transfer time of the robot, a problem is presented in evaluating how the speed of the robot can be increased or optimized, during the multiple motions necessary to move material through a process tool, without causing sliding of the substrate on the end effector.

With most existing substrate handling robots, a method known as "trapezoidal velocity profile" is used to profile their motion. Two problems with this method are:

1) the acceleration rate and velocity is fixed throughout the motion, so that they must be lowered to prevent any one point in the profile from violating a constraint, regardless of the fact that the rest of the profile is not optimal; and 2) sudden changes in the acceleration (transitional points in the velocity) excite vibrations in the system which limit acceleration since, when a substrate is being carried, the command velocity and acceleration must be lowered to account for the added acceleration due to vibration, and when a substrate is not being carried, the commanded acceleration must be lowered to account for the wasted torque used to control the vibrations.

A modified form of the "trapezoidal" approach is the "S-curve trajectory" approach that controls the sudden change in acceleration and, in turn, reduces the vibration. However, since the "S-curve" approach, like the "trapezoidal" approach, does not maintain optimal velocity throughout the motion, ultimately time is lost.

An illustration of the "trapezoidal velocity profile" and the "S-curve profile" as compared to an optimal profile for minimizing transfer time is seen in FIG. 1, which shows velocity with respect to time curves for commanded velocity at the robot arm drive motor. Corresponding acceleration with respect to time curves are shown in FIG. 2 for acceleration at the substrate. It will be seen that at the transitional points, i.e., at the velocity slope change, excessive vibration can occur with the "trapezoidal" approach due to abrupt acceleration change. These vibrations can disturb the substrate position on the end effector causing substrate placement errors and substrate damage in certain process tools. The closed form trapezoidal, i.e., "S-curve", algorithm generates trajectories substantially without the transition effects and the resulting vibration, but, it will be noted that the S-curve trajectory results in an acceleration sag at the transitional points which causes a loss in velocity and a sub-optimal total transfer time from start at the beginning end point to stop at the final end point.

An algorithmic approach that can be used to find the time optimal trajectory for torque limited Industrial Robots is known and described in the following series of IEEE papers, incorporated herein by reference,:

1) K. G. SHIN ET AL, "Minimum-Time Trajectory Planning for Industrial Robots with General Torque Constraints", IEEE Transactions on Automatic Control, vol. AC-31, no. 6, June 1986, pps. 412–417;

2) F. PFEIFFER ET AL, "A Concept for Manipulator Trajectory Planning", IEEE Journal of Robotics and Automation, Vol. RA-3, No. 3, April 1987, pps. 115–123;

3) J-J. E. SLOTINE ET AL, "Improving the Efficiency of Time-Optimal Path-Following Algorithms", IEEE Transactions on Robotics and Automation, Vol. 5, No. 1, Feb. 1989, pps. 118–124; and 4) Z. SHILLER ET AL, "Robust Computation of Path Constrained Time Optimal Motions", IEEE Transactions on Robotics and Automation, 1990, pps. 144–149.

The application of this algorithmic approach in unmodified form, however, can cause the excitation of resonances in the robot arm when changing command acceleration suddenly, and it does not constrain the acceleration of the payload or substrate so that, if applied to substrate handling robots, sliding of the substrate may occur. The components of the acceleration occurring at the substrate can be broken into this excitation of uncontrolled resonances and the commanded acceleration, but the algorithm offers no suggestion of how to control the resonances to avoid the sliding.

Objects:

It is therefore an object of the present invention to provide a method and means for increasing the throughput of substrate handling tools, such as Cluster Tool Robots, by shortening the transfer time of the robot.

It is another object of the invention to provide a method and means for producing a time optimal robot arm trajectory for increasing substrate handling tool throughput.

It is a further object of the invention to provide a method and means for producing a time optimal robot arm trajectory for increasing substrate handling tool throughput which avoids sliding of the payload or substrate with respect to its support.

It is also an object to provide a method and means that minimize vibration in the robot arm and thus allow time to be minimized with or without a substrate.

SUMMARY OF THE INVENTION

The present invention involves the application of the above-described prior art algorithmic approach used for finding the time optimal trajectory for torque limited Industrial Robots, to achieve the operation of substrate handling tools, such as Cluster Tool Robots, in an improved manner by modifying the applied algorithm through adding two additional constraints, i.e., jerk (the rate of change of acceleration) and the acceleration seen by the load. Since Cluster Tool Robots have end effectors at the ends of the articulated arms which hold substrates to be processed thereon only by friction, excessive acceleration is problematical. The present modification renders it possible to create a robot arm trajectory that minimizes travel time by minimizing the excitation of uncontrolled resonances and avoiding command of an acceleration that would exceed the force of friction.

DETAILED DESCRIPTION OF THE PREFERRED EMBODIMENT

The present invention involves a method or algorithm and apparatus for operating substrate handling tools, e.g., Cluster Tool Robots, in an efficient manner, which minimize the time required for a motor-driven, articulated arm to travel a set distance by maximizing the average velocity over that distance while avoiding the excitation of uncontrolled resonances and the command of an acceleration that would exceed the force of friction between the end effector and a substrate supported thereon.

Figure 1:
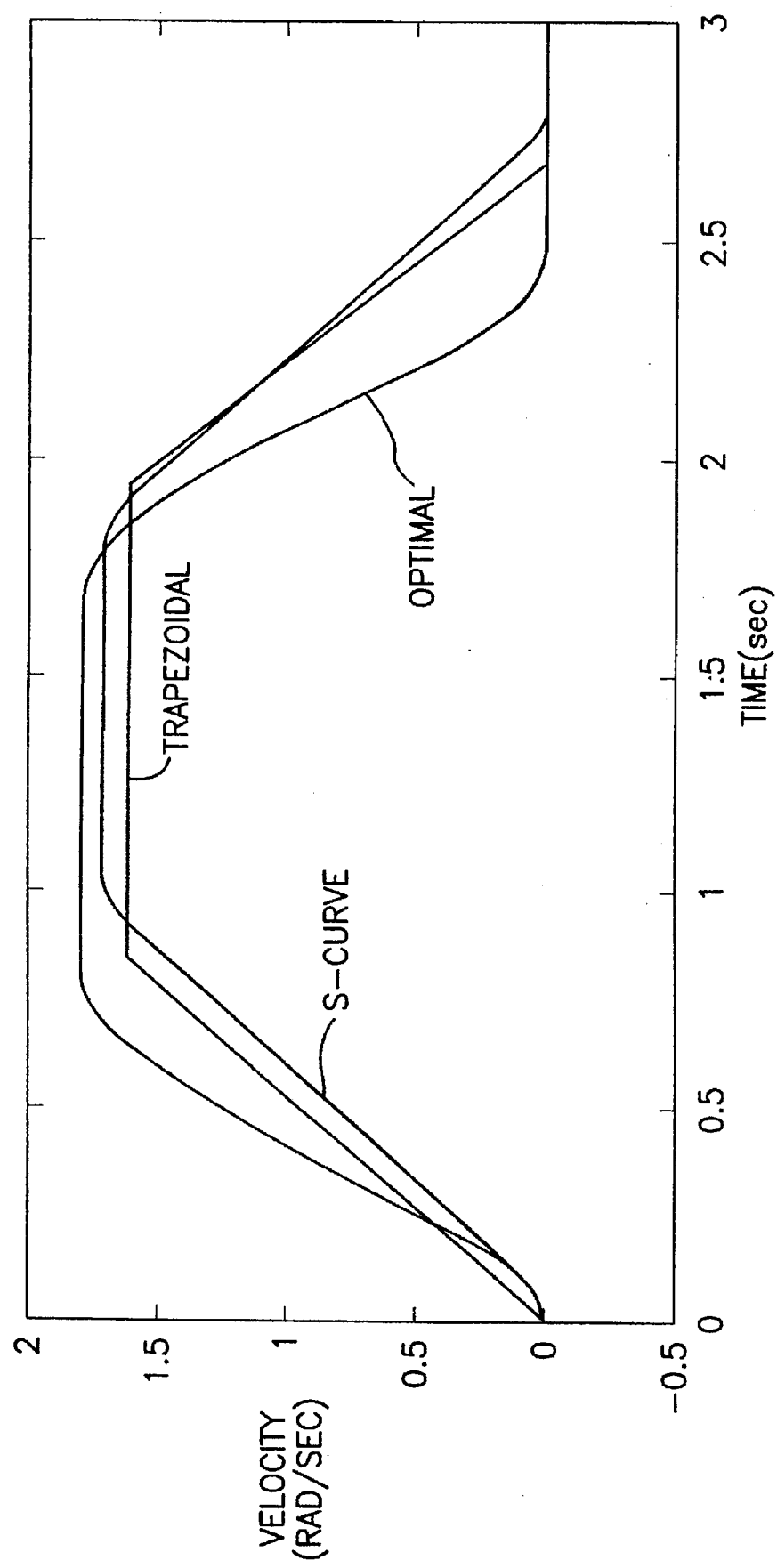
FIG. 1 illustrates the "trapezoidal velocity profile" and the "S-curve profile" as compared to an optimal profile for minimizing transfer time in the form of velocity with respect to time curves for commanded velocity at the robot arm drive motor.
Figure 2:
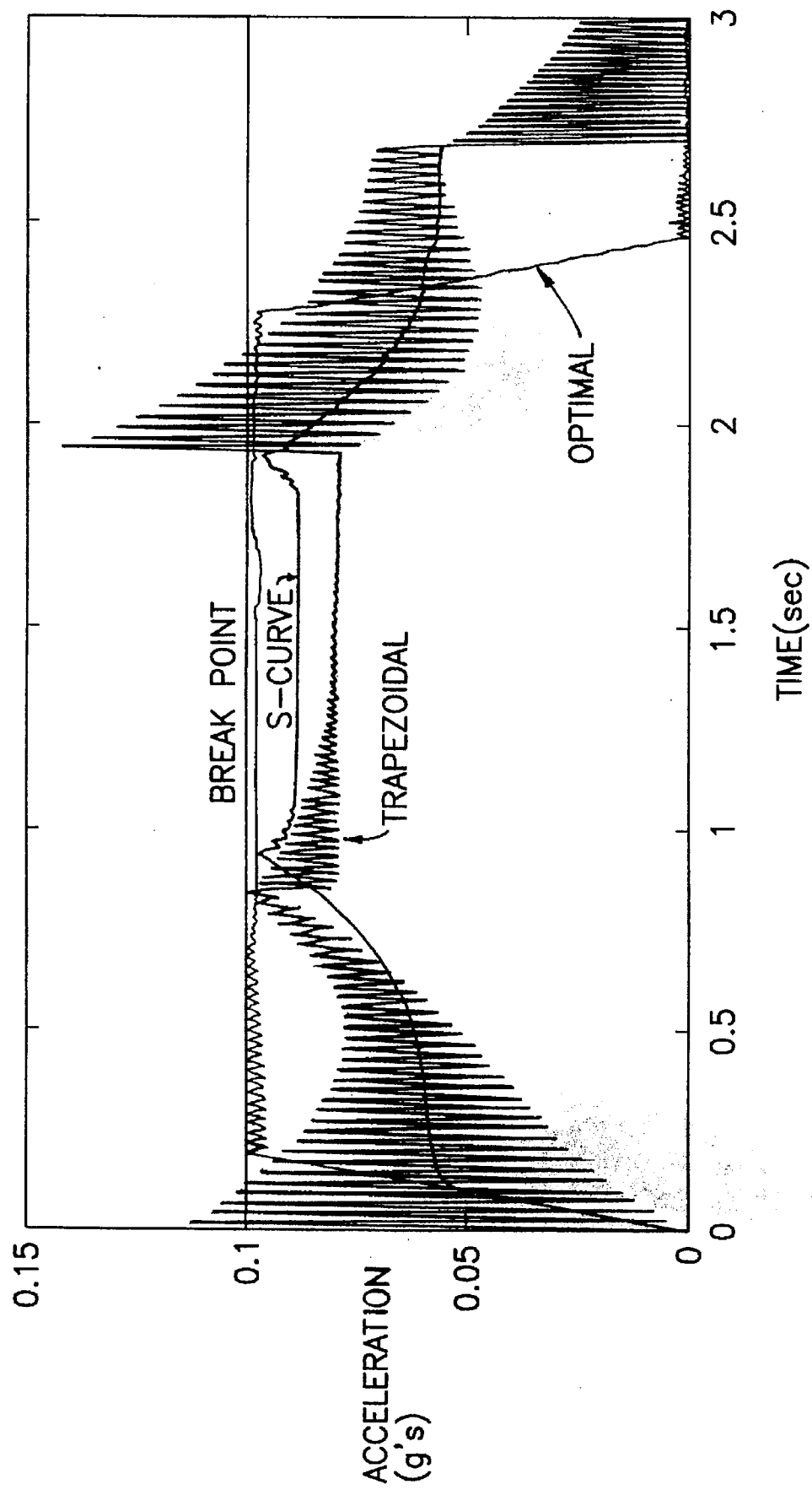
FIG. 2 shows acceleration with respect to time profiles for the curves of FIG. 1 for acceleration at the substrate.
Figure 3:
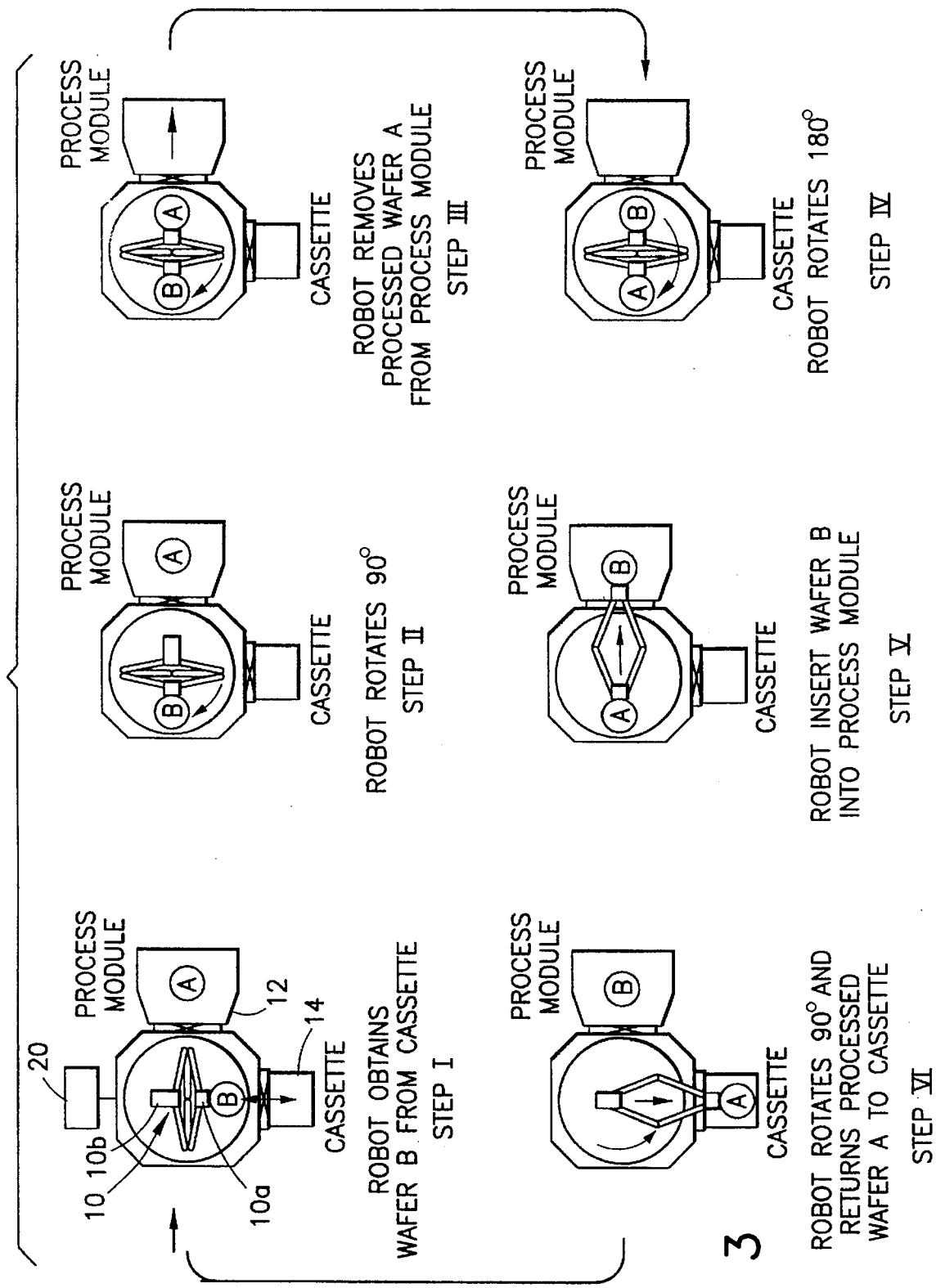
FIG. 3 illustrates an example of a Cluster Tool Robot undergoing a six-step operation in processing semiconductor wafers, which Robot is of a type to which the present invention may be applied.

By way of a specific description FIG. 3 illustrates an example of a Cluster Tool Robot undergoing a six-step operation in processing semiconductor wafers, which Robot is of a type to which the present invention may be applied. In step I, the dual arm robot 10, which has deposited a wafer A for processing in a process module 12, obtains a wafer B from an input cassette 14 onto the end effector 10a of one of its arms. The robot 10 then rotates 90°, as shown in step II, to orient the empty end effector 10b opposite the process module 12. In step III, the robot removes processed wafer A on end effector 10b from the process module 12. The robot 10 is then rotated 180° to position wafer B opposite the process module 12. The robot 10 may then insert wafer B into the process module 12 for processing and is subsequently rotated 90° to a position where processed wafer A is returned to the input cassette 14 to complete a cycle of operation.

The movements in the operating cycle may be controlled by a drive system 20 which may incorporate a digital signal processor and time optimal trajectory software in accordance with the invention. The software will particularly provide an operating algorithm for moving the robot arm-set in a trajectory in keeping with specific constraints as will now be explained.

The robot arms are operated by a motor and it should be understood that at any point in time the robot motor will be at a given position, velocity, and acceleration, i.e., a "dynamic state". The following equation defines the appropriate relationship of the position, velocity, and acceleration of the motor at any dynamic state.

$$\text{position}(t) = \left( \int_0^T \text{velocity}(t) dt \right) = \left( \int_0^T \int_0^T \text{acceleration}(t) dt\, dt \right)$$

From this equation it is apparent that position, velocity, acceleration and time are all interdependent. Also, while the motor has been focused upon, it will be understood that the relationship between the motor and the robot arm, and vice versa, is directly defined by the kinematic and inverse kinematic equations, respectively, as is well known in the robotics art. It can be shown that the time required for the motor, and thus the robot arm, to travel a set distance is minimized by maximizing the average velocity over the distance. However, to meet the frictional requirements at the load or substrate, the velocity and acceleration should be limited by the following constraints:

1. The acceleration at the load—it can be shown that the horizontal acceleration required to cause sliding of the sample or substrate on the end effector is equal to the coefficient of static friction between the substrate and the end effector multiplied by the acceleration of gravity; and
2. Jerk rate, i.e., the rate of change of acceleration—jerk limiting helps prevent the excitation of resonances in the robot arm-set.

An additional constraint consideration is:

3. Motor torque limits, i.e., the trajectory to be followed must never require more torque than is available.

The acceleration constraints are complex and nonlinear; thus, a closed-form solution for the arm trajectory is extremely difficult, if not impossible. By employing a dynamic programming technique, however, using a trial and error or heuristic approach, the time optimal trajectory can be found. This technique minimizes move time by maximizing velocity at every point along the path of the trajectory.

Algorithm

The improved technique involves a system and algorithm which first solves the trajectory backward, i.e., over a path beginning with the final position or final end point back to the start position or beginning end point. The trajectory path, as noted, is constrained by substrate acceleration, the jerk rate, and the motor torque limits. However, these constraints do not drive the velocity to zero at the end of the trajectory, i.e., the start position.

Once the backward trajectory is solved the trajectory is resolved forward. Then, by adding the backward trajectory to the list of constraints, the velocity is driven to zero at the end of the move, i.e., the final position.

Figure 4:
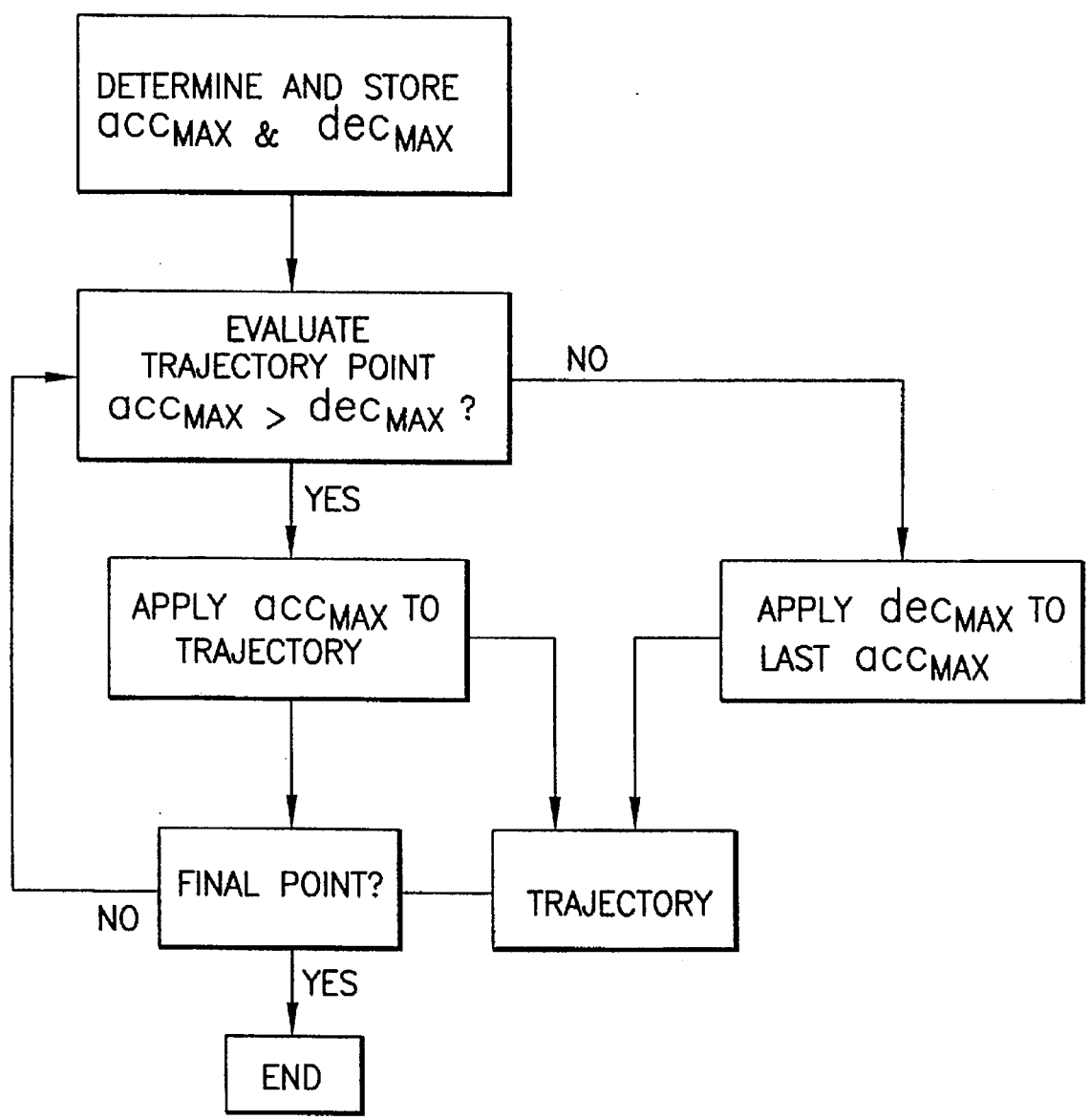
FIG. 4 is a flowchart illustrating an algorithm used to find the trajectories for operating the robot arm in accordance with the invention.

The following steps, as shown in the flowchart in FIG. 4, may be used to find the trajectories:

STEP 1: Determine and store the value of the maximum acceleration that does not violate any of the constraints ($acc_{MAX}$), and the value of the maximum deceleration that does not violate any of the constraints ($dec_{MAX}$).

STEP 2: Evaluate a point on the trajectories, using the criterion that such a point is a valid dynamic state if the maximum acceleration is greater than the maximum deceleration, in accordance with the stored values.

STEP 3: If the trajectory point being evaluated is a valid dynamic state, then go to STEP 5:

STEP 4: If the trajectory point being evaluated is not a valid dynamic state, then go back down the states found until the last point that the maximum acceleration was applied is found. Then, apply maximum deceleration instead and determine the next dynamic state by going to STEP 6.

STEP 5: Apply the maximum acceleration and determine the next dynamic state by going to STEP 6.

STEP 6: If after the maximum acceleration or maximum deceleration has been applied to the trajectory, the end point or final position has not been passed then go to STEP 2, otherwise END.

Thus, it will be seen that the procedure generally involves plotting a trajectory by moving from dynamic state to dynamic state and selecting as points on the trajectory dynamic states that do not violate the prescribed constraints and that maximize the average velocity. The acceleration has been used in the foregoing procedure and, as it is directly related to the velocity, a suitable transformation to velocity may readily be made.

System

Figure 5:
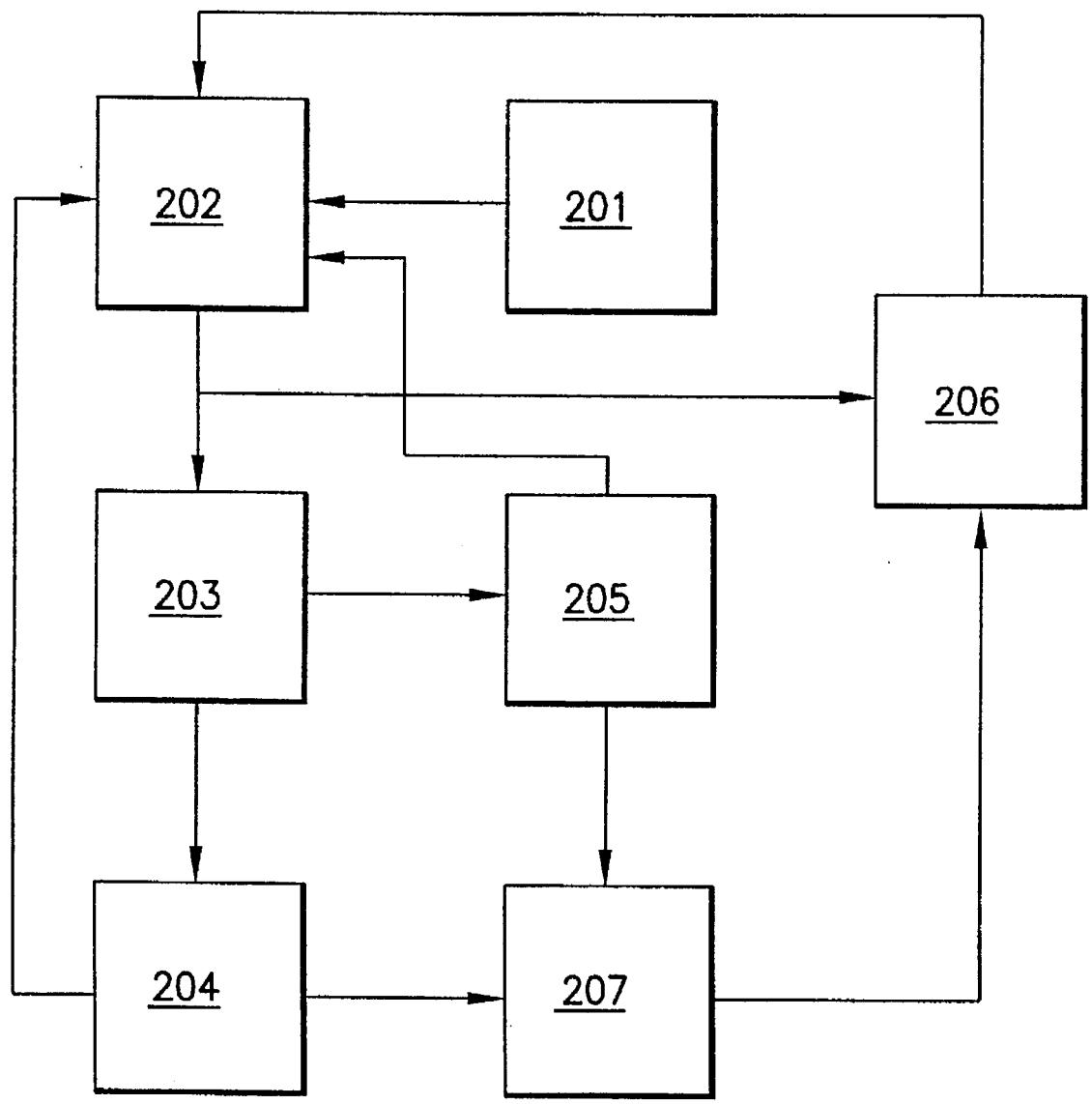
FIG. 5 is a block diagram illustrating a set of operating components, which may be implemented in the form of hardware or software, for carrying out the present invention.

A block diagram of a set of operating components, which may be implemented in the form of hardware or software and contained in the drive system 20, is shown in FIG. 5. A first component 201, including a memory, is used for determining and storing the maximum acceleration that does not violate any of the aforementioned constraints, and the maximum deceleration that does not violate any of those constraints. A second component 202, containing appropriate logic, evaluates a point on the trajectory using the criterion that such a point has a valid dynamic state if the maximum acceleration is greater than the maximum deceleration, using the stored values, and produces a signal indicative of the results of the evaluation. A third component 203, involving further logic, is responsive to the evaluation indicative signal, and produces a first signal if the point being evaluated on the trajectory has a valid dynamic state, and produces a second signal if the point being evaluated on the trajectory does not have a valid dynamic state. A fourth component 204, in response to the production of a first signal, sends a signal to a trajectory plotting component 207 to apply the maximum acceleration at the point being evaluated and produces an initiation signal to cause the second component 202 to evaluate the next dynamic state. A fifth component 205, in response to the production of a second signal, sends a signal to component 207 to go back down the states already found until the last point the maximum acceleration was applied is found, and to apply the maximum deceleration instead, and produces an initiation signal to cause the second component 202 to evaluate the next dynamic state. A sixth component 206, including a counter, responsive to the signals of the second component 202 indicating the evaluations of the dynamic states and to the point values in component 207, produces an enabling signal which permits the second component 202 to evaluate the next dynamic state if the final end point of the trajectory has not been passed, and produces an END signal preventing the evaluation when the final end point is reached in component 207. The resulting combination of points with appropriate dynamic states provides a time optimal trajectory for the robot arm which will avoid accelerations that would cause movement of a workpiece or substrate, supported on the end effector of the arm, with respect to the arm.

In view of the acceleration problems described above, it will be appreciated that the existing substrate handling tools, such as Cluster Tool Robots, have been forced to use a sub-optimal closed form trapezoidal, or S-curve, algorithm for the generation of trajectories. However, the present invention improves on this prior art robot operation by generating a time optimal trajectory through a heuristic or trial and error method. It is an improvement on the above-cited IEEE articles' algorithmic approach because that approach does not constrain the acceleration at the load or the jerk. Without these additional constraints the method could not be applied successfully to robots which handle substrates using a friction-type support. Accordingly, substrate handling or Cluster Tool throughput is maximized by shortening the transfer time of the robot arms using the invention.

While the description has involved the use of a Cluster Tool Robot in connection with the processing of semiconductor wafers, other workpieces and substrates may be readily handled such, for example, as flat panel displays. Also, in addition to Cluster Tool Robots, the invention may be applied in other handling tools such, for example, as Ion Implant machines. The implementation of the invention may take many forms, either in hardware or software or combinations thereof, the particular form for any specific application being readily within the capability of those of skill in the art in the light of the foregoing description.

What is claimed is:

1. A method of operating a workpiece handling tool with a friction-type workpiece holder, said method minimizes time required for a motor-driven, articulated arm of said tool to travel a set distance to a final end point by maximizing an average velocity over the set distance while avoiding an excitation of uncontrolled resonances and a command of an acceleration that would exceed a frictional force between an end effector at an end of the arm and a workpiece supported thereon, comprising the steps of:

determining a trajectory of arm travel, limiting a travel velocity and acceleration by constraints comprising:
    acceleration at the workpiece, such that a horizontal acceleration at the workpiece is equal to a coefficient of a static friction between the workpiece and the end effector multiplied by the gravity acceleration; and
    jerk rate, such that excitation of resonances in the arm is minimized; and
    finding points of trajectory of arm travel by moving from one dynamic state to a next dynamic state and selecting, as points on the trajectory of arm travel, dynamic states that do not violate said constraints and maximize the average velocity of arm travel over the set distance.

2. The method as in claim 1 wherein the step of finding points of trajectory of arm travel comprises determining points of maximum acceleration and maximum deceleration thereof by the steps comprising:

determining and storing the values of the maximum acceleration that does not violate any of said constraints and the maximum deceleration that does not violate any of said constraints;

evaluating a point on the trajectory of arm travel for a valid dynamic state by determining if the maximum acceleration is greater than the maximum deceleration, using said stored values, and if so, applying the maximum acceleration at said point, and then determining a next dynamic state;

if said point being evaluated does not have a valid dynamic state, then going back down the states found until the last point the maximum acceleration was applied is found, and applying the maximum deceleration instead, and then determining a next dynamic state; and when a final end point of the trajectory has been reached ceasing the determination of a next dynamic state.

3. The method as in claim 1 wherein the relationship of position, velocity, and acceleration of the end of the arm at any dynamic state is:

$$\text{position}(t) = \left( \int_0^T \text{velocity}(t)dt \right) = \left( \int_0^T \int_0^T \text{acceleration}(t)dt\,dt \right)$$

4. The method as in claim 1 wherein the trajectory of arm travel has a start end point and the steps of finding points of trajectory comprise first carrying out the evaluating of trajectory points by solving the trajectory backward, i.e., from the final end point back to the start end point, then solving the trajectory forward and adding the backward trajectory to the list of constraints, whereby the velocity is driven to zero at the final end point.

5. The method as in claim 1 further comprising a driving motor for providing available torque to said articulated arm and wherein said constraints further comprise motor torque limits, such that the trajectory to be followed must never require more torque than is available from the driving motor.

6. Apparatus for operating a workpiece handling tool with a friction-type workpiece holder, said apparatus minimizes time required for a motor-driven, articulated arm of said tool to travel a set distance to a final end point by maximizing an average velocity over the set distance while avoiding an excitation of uncontrolled resonances and a command of an acceleration that would exceed a frictional force between an end effector at an end of the arm and a workpiece supported thereon, comprising:

means for determining points of a trajectory of arm travel, including a start end point, while limiting a travel velocity and acceleration by constraints of:

acceleration at the workpiece, such that a horizontal acceleration at the workpiece is equal to a coefficient of a static friction between the end effector multiplied by the gravity acceleration; and jerk rate, such that excitation of resonances in the arm is minimized;

and wherein said determining means comprises means for finding trajectory points by moving from one dynamic state to a next dynamic state and selecting, as points on the trajectory, dynamic states that do not violate said constraints and maximize the average velocity of arm travel over the set distance.

7. The apparatus of claim 6 wherein said means for finding points of trajectory comprises:

means for plotting accelerations at points on the trajectory;

first means for determining and storing the value of the maximum acceleration that does not violate any of said constraints, and the value of the maximum deceleration that does not violate any of said constraints;

second means for evaluating a point on the trajectory using the criterion that such a point has a valid dynamic state if the maximum acceleration is greater than the maximum deceleration, in accordance with said stored values, and producing a signal indicative of said evaluation;

third means, responsive to said evaluation indicative signal, for producing a first signal if a point being evaluated on the trajectory has a valid dynamic state, and for producing a second signal if a point being evaluated on the trajectory does not have a valid dynamic state;

fourth means, responsive to said first signal, for sending a signal to said plotting means to apply the maximum acceleration at said point being evaluated, and producing an initiation signal to cause said second means to evaluate a next dynamic state;

fifth means, responsive to said second signal, for sending a signal to said plotting means to go back down the states found until the last point the maximum acceleration was applied is found, and apply the maximum deceleration instead, and producing an initiation signal to cause said second means to evaluate a next dynamic state; and sixth means, responsive to the dynamic state evaluation indicative signals and the points of said plotting means, for producing an enabling signal permitting said second means to evaluate a next dynamic state if a final end point of the trajectory has not been passed, and for producing an END signal preventing said second means from evaluating the next dynamic state when said final end point is reached.

8. The apparatus of claim 6 wherein said second means for evaluating a point on the trajectory comprises:

means for first carrying out the evaluating of trajectory points by solving the trajectory backward, i.e., from a final end point back to a start end point; and means for solving the trajectory forward and adding the solved backward trajectory to the list of said constraints, whereby the velocity is driven to zero at the final end point.

9. The apparatus of claim 6 further comprising motor means for driving said articulated arm and wherein said constraints further comprise motor torque limits, such that the trajectory to be followed must never require more torque than is available from said motor means.

10. A method of operating a substrate handling tool with a friction-type substrate holder, said method minimizes time required for a motor-driven, articulated arm of said tool to travel a set distance to a final end point from a start end point by maximizing an average velocity over the set distance while avoiding an excitation of uncontrolled resonances and a command of an acceleration that would exceed a frictional force between an end effector at the end of the arm and a substrate supported thereon, comprising the steps of:

determining points of a trajectory of arm travel, limiting a travel velocity and acceleration by constraints comprising:

acceleration at the substrate, such that a horizontal acceleration at the substrate is equal to a coefficient of a static friction between the substrate and the end effector multiplied by the gravity acceleration; and jerk rate, such that excitation of resonances in the arm is minimized; and finding points of the trajectory by determining the dynamic states thereof by the steps comprising:

STEP 1: determining and storing the values of the maximum acceleration that does not violate any of said constraints and the maximum deceleration that does not violate any of said constraints;

STEP 2: evaluating a point on the trajectory using the criterion that such a point has a valid dynamic state if the maximum acceleration is greater than the maximum deceleration, in accordance with said stored values;

STEP 3: if a point being evaluated on the trajectory has a valid dynamic state, then going to STEP 5 wherein the maximum acceleration is applied at said point;

STEP 4: if a point being evaluated on the trajectory does not have a valid dynamic state, then going back down the states found until the last point the maximum acceleration was applied is found, and applying the maximum deceleration instead, and determining a next dynamic state by going to STEP 6;

STEP 5: applying the maximum acceleration, and determining a next dynamic state by going to STEP 6; and STEP 6: if a final end point of the trajectory has not been passed then determining a next dynamic state by going to STEP 2, otherwise END.

11. The method as in claim 10 wherein the relationship of position, velocity, and acceleration of the end of the arm at any dynamic state is:

$$\text{position}(t) = \left( \int_0^T \text{velocity}(t) dt \right) = \left( \int_0^T \int_0^T \text{acceleration}(t) dt\, dt \right)$$

12. The method as in claim 10 wherein the steps of finding points of the trajectory comprise first carrying out the evaluating of trajectory points by solving the trajectory backward, i.e., from the final end point back to the start end point, then solving the trajectory forward and adding the backward trajectory to the list of constraints, whereby the velocity is driven to zero at the final end point.

13. The method as in claim 10 wherein said constraints further comprise motor torque limits, such that the trajectory to be followed must never require more torque than is available.

* * * * *